UNITED STATES PATENT OFFICE.

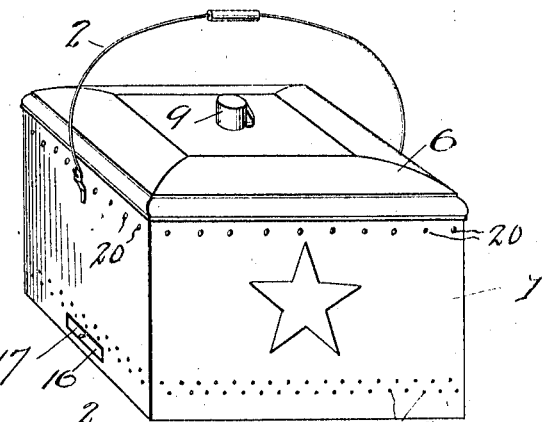
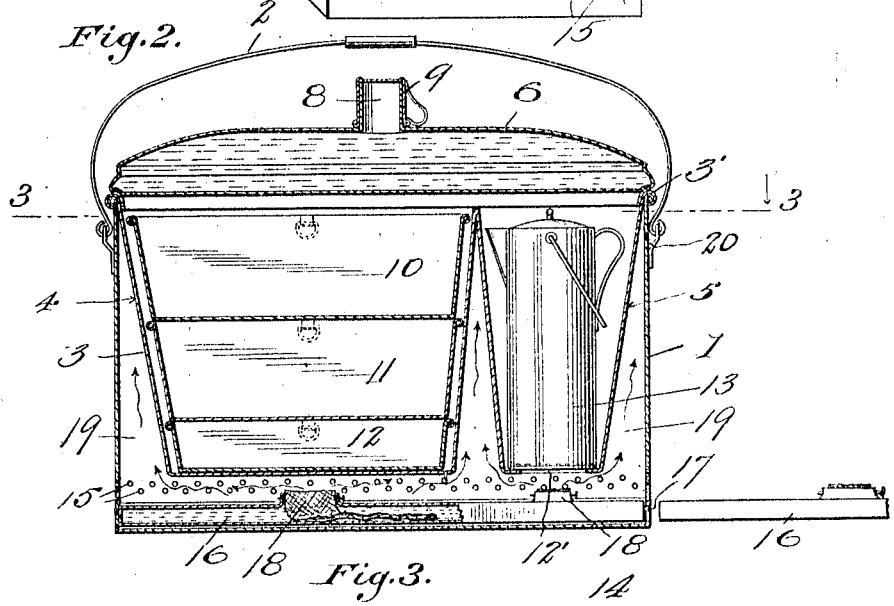
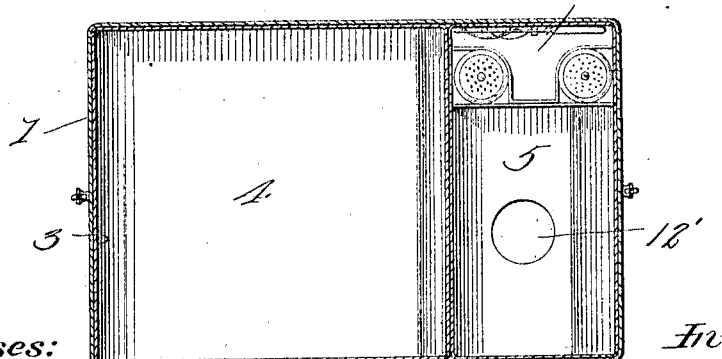

ALMON W. BROWN, OF MUSKOGEE, OKLAHOMA.

DINNER-PAIL.

945,302.  Specification of Letters Patent.  Patented Jan. 4, 1910.

Application filed October 2, 1906, Serial No. 337,125. Renewed December 2, 1909. Serial No. 531,115.

*To all whom it may concern:*

Be it known that I, ALMON W. BROWN, a citizen of the United States, residing at Muskogee, Oklahoma, have invented new and useful Improvements in Dinner-Pails, of which the following is a specification.

My invention relates to improvements in dinner pails, and has for its object the provision of a device of this character by means of which cooked or other prepared foods and beverages, may be conveniently carried in separate compartments in the pail, and the contents of the pail or bucket warmed or heated to a palatable taste by simple heating devices carried in the receptacle.

A further object is to provide a compact device which will be comparatively inexpensive, but will include desirable advantages for this class of devices.

With these objects in view my invention consists in certain novel features of construction and combinations and arrangements of parts embodied in a device as above indicated, by means of which water, a variety of victuals and a beverage may be warmed or heated preparatory to consumption, as illustrated in the accompanying drawings, described in the specification and more clearly pointed out in the claim.

In the accompanying drawings which form a part hereof, I have illustrated one example of the physical embodiment of my invention, constructed according to the best mode I have so far devised for the practical application of the principle.

Figure 1 is a perspective view of a dinner pail or bucket embodying the novel features of the present invention. Fig. 2 is a vertical central section of the pail illustrated in Fig. 1, and Fig. 3 is a horizontal section on line 3—3 of Fig. 2.

Referring to the figures of drawing, the numeral 1 designates an outer metallic receptacle, preferably of tin, of convenient shape, and having a bail or handle 2; 3, an inner receptacle, composed of two compartments 4 and 5 and suspended from the upper edge of the receptacle 1 by means of the flange 3', the walls of the compartments 4 and 5 being tapered as shown; 6, a hollow lid or cover for the receptacle 1, forming a water chamber or reservoir; and adapted to fit neatly in the opening of the pail; 8, a tube or spout, preferably cylindrical in cross section, located on and projecting from the top center of the water reservoir and communicating therewith; 9, a metallic cup provided with a handle, and adapted, when inverted, to fit over the spout 3 and close the same; 10, 11, and 12, a series of pans or trays, nested one above the other, and conforming in outline to the tapered shape of the inner receptacle, and adapted to contain a variety of foods or victuals; 12', a central opening in the bottom of the smaller compartment 5; 13, a coffee pot, or other beverage receptacle, inclosed in the compartment 5, and seated over the opening 12' in the bottom thereof.

The corner section 14 may be divided from the smaller compartment 5 and is adapted to receive a knife, fork, spoon, condiment holders, etc.

The numerals 15 designate perforations in the outer receptacle 1, located near the bottom thereof, to provide proper ventilation; 16, a metallic liquid fuel holding receptacle or reservoir, preferably rectangular in shape and comparatively flat in cross section, and adapted to be entered through an opening 17 in the side wall of the receptacle 1 and rest on the bottom of the outer receptacle below the inner receptacle; 18, 18, burners forming part of the heating device; and 19, hot air spaces or chambers formed between the walls of the inner and outer receptacles of the device.

It will be observed that the inner receptacle is suspended a suitable distance above the burners or heating devices, and that the walls thereof are tapered or inclined, thus providing heating surface on both the bottom and sides of the inner receptacle, and the gases of combustion are permitted to pass around the chambers as indicated by arrows in Fig. 2.

The reservoir 16 may be filled with wood alcohol as a fuel and is permanently carried in the lower portion of the receptacle 1. When it is desired to light the burners the reservoir is withdrawn from receptacle 1 through opening 17 the burners lighted, and the heating device again entered through opening 17.

Ventilation is provided through the perforations 20 in the outer casing.

Assuming the upper tray 10 to contain bread, pastry etc.; the intermediate tray 11, vegetables, and the lower tray 12 meats, eggs etc.; the coffee pot located in position, and the lid or cover filled with water, the heat from the burners passes through the heating chambers or spaces, as indicated by the arrows and warms the foods as desired. The bottom of the coffee pot is exposed, through opening 12, directly to the flame from one of the burners, and the coffee therein heated to the desired degree.

When the water in the cover or lid has been heated to the desired temperature, the reservoir may be lifted bodily from the pail, and after removal of the cup, the contents may be poured and used as desired.

From the foregoing description taken in connection with the drawings, it becomes obvious that I have produced a device which fulfils all the conditions set forth as the purpose of my invention.

Having thus fully described my invention, what I claim as new and desire to secure by Letters Patent is:—

In a dinner pail, the combination of an outer receptacle and an inner receptacle, said inner receptacle being suspended from the outer receptacle and formed with inclined walls, said inner receptacle being also formed into two compartments separate from each other at their lower portions, one of said compartments being open at the bottom, burners situated below said compartments, a plurality of trays nested in one of said compartments, the other compartment adapted to receive a cooking vessel, and a hollow cover for said pail, said cover adapted to receive a liquid to be heated.

A. W. BROWN.

Attest:
ARTHUR LEE BROOK,
W. N. BROOK.